(12) United States Patent
Van Uden et al.

(10) Patent No.: US 11,735,957 B2
(45) Date of Patent: Aug. 22, 2023

(54) WIRELESS POWER TRANSFER

(71) Applicant: KONINKLIJKE PHILIPS N.V., Eindhoven (NL)

(72) Inventors: Martijn Gerarda Lambertus Justinus Van Uden, Eindhoven (NL); Klaas Jacob Lulofs, Veldhoven (NL); Roelf Van Der Wal, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 283 days.

(21) Appl. No.: 16/981,303

(22) PCT Filed: Jun. 26, 2019

(86) PCT No.: PCT/EP2019/067009
§ 371 (c)(1),
(2) Date: Sep. 16, 2020

(87) PCT Pub. No.: WO2020/002431
PCT Pub. Date: Jan. 2, 2020

(65) Prior Publication Data
US 2021/0249888 A1 Aug. 12, 2021

(30) Foreign Application Priority Data

Jun. 29, 2018 (EP) ..................... 18180884

(51) Int. Cl.
*H02J 50/12* (2016.01)
*H02M 3/335* (2006.01)
(Continued)

(52) U.S. Cl.
CPC ............... *H02J 50/12* (2016.02); *H02J 7/02* (2013.01); *H02M 3/01* (2021.05);
(Continued)

(58) Field of Classification Search
CPC .. H02J 50/12; H02J 7/02; H02M 3/01; H02M 3/33573; H02M 3/33584; H02M 7/5387; H02M 7/4815; Y02B 70/10
See application file for complete search history.

(56) References Cited

U.S. PATENT DOCUMENTS 5,633,577 A * 5/1997 Matsumae ............ H02J 7/0013
320/138
6,335,871 B1 * 1/2002 Kita .................. H02M 3/33584
363/35
(Continued)

FOREIGN PATENT DOCUMENTS

CN 104218691 A 12/2014

OTHER PUBLICATIONS

International Search Report for PCT/EP2019/067009 dated Jun. 26, 2019.
(Continued)

*Primary Examiner* — Yusef A Ahmed
(74) *Attorney, Agent, or Firm* — Daniel H. Brean

(57) ABSTRACT

A battery includes a first electronic circuit configured to operate in a transfer mode to wirelessly transfer power to a device and to operate in a receive mode to wirelessly receive power from the device. The first electronic circuit also configured to adapt a voltage gain of the first electronic circuit to compensate for a voltage drop between the battery and the device during any one or more of the wireless transfer of power to the device when the battery is operating in the transfer mode and the wireless receipt of power from the device when the battery is operating in the receive mode.

13 Claims, 6 Drawing Sheets

(51) Int. Cl.
*H02J 7/02* (2016.01)
*H02M 7/5387* (2007.01)
*H02M 3/00* (2006.01)

(52) U.S. Cl.
CPC ... *H02M 3/33573* (2021.05); *H02M 3/33584* (2013.01); *H02M 7/5387* (2013.01)

(56) References Cited

U.S. PATENT DOCUMENTS

| | | | |
|---|---|---|---|
| 8,947,041 B2 | 2/2015 | Cook | |
| 9,266,441 B2* | 2/2016 | Abe | B60L 50/16 |
| 9,906,067 B1* | 2/2018 | Garrity | H02J 7/04 |
| 9,960,687 B2* | 5/2018 | Elasser | H02M 3/33571 |
| 10,256,661 B1* | 4/2019 | Lu | H02J 7/342 |
| 11,043,847 B2* | 6/2021 | Cheng | H02J 7/00034 |
| 2007/0035883 A1* | 2/2007 | Katcha | H01F 38/18 |
| | | | 360/281.8 |
| 2010/0148723 A1* | 6/2010 | Cook | G06K 19/0702 |
| | | | 320/108 |
| 2011/0164437 A1* | 7/2011 | Sun | H02M 3/01 |
| | | | 363/16 |
| 2011/0221387 A1* | 9/2011 | Steigerwald | H02J 50/10 |
| | | | 320/108 |
| 2012/0112534 A1 | 5/2012 | Efe et al. | |
| 2012/0161696 A1* | 6/2012 | Cook | B60L 53/68 |
| | | | 320/108 |
| 2012/0169137 A1* | 7/2012 | Lisi | H02J 50/80 |
| | | | 307/104 |
| 2014/0084862 A1* | 3/2014 | Kawaguchi | H02J 50/80 |
| | | | 320/108 |
| 2014/0347008 A1* | 11/2014 | Chae | H02J 50/402 |
| | | | 320/108 |
| 2015/0035376 A1* | 2/2015 | Baarman | H02J 50/40 |
| | | | 307/104 |
| 2015/0207333 A1* | 7/2015 | Baarman | H02J 50/001 |
| | | | 307/104 |
| 2015/0229225 A1* | 8/2015 | Jang | H02M 3/285 |
| | | | 363/17 |
| 2016/0156217 A1 | 6/2016 | Pitts | |
| 2016/0176300 A1* | 6/2016 | Bucher | B60L 53/122 |
| | | | 307/104 |
| 2017/0033586 A1* | 2/2017 | Weidner | H02M 3/33573 |
| 2017/0133862 A1 | 5/2017 | Jung et al. | |
| 2017/0149286 A1* | 5/2017 | Joye | H04B 5/0037 |
| 2017/0222488 A1* | 8/2017 | Madawala | H02M 3/33576 |
| 2018/0194236 A1* | 7/2018 | Elshaer | B60L 53/12 |
| 2018/0233953 A1* | 8/2018 | Thrimawithana | H02J 50/12 |
| 2018/0257494 A1* | 9/2018 | Yang | B60L 53/14 |
| 2019/0020281 A1* | 1/2019 | Yang | H02M 7/5387 |
| 2019/0052126 A1* | 2/2019 | Lee | H02J 50/60 |
| 2019/0260232 A1* | 8/2019 | Liu | H02M 3/01 |
| 2019/0312460 A1* | 10/2019 | Van Boheemen | H02M 7/217 |
| 2019/0341796 A1* | 11/2019 | Gu | H02M 3/33584 |
| 2020/0373785 A1* | 11/2020 | Bagchi | H02M 3/33592 |
| 2020/0373847 A1* | 11/2020 | Saha | H02M 3/33576 |
| 2022/0037927 A1* | 2/2022 | Lee | H02J 7/00711 |
| 2022/0103015 A1* | 3/2022 | Nussbaum | H02M 3/33584 |
| 2022/0263428 A1* | 8/2022 | Kim | H02M 1/4233 |
| 2022/0278554 A1* | 9/2022 | Mishima | H02J 50/12 |
| 2022/0320907 A1* | 10/2022 | Cui | H02J 50/12 |
| 2022/0368160 A1* | 11/2022 | Hui | H02J 7/007182 |

OTHER PUBLICATIONS

Qin, Z. "A voltage doubler circuit to extend the soft-switching range of dual active bridge converters". IEEE Applied Power Electronics Conference and Exposition, Mar. 2017, pp. 300-306.

* cited by examiner

WIRELESS POWER TRANSFER

CROSS-REFERENCE TO PRIOR APPLICATIONS

This application claims the priority benefit under 35 U.S.C. § 371 of International Patent Application No. PCT/EP2019/067009, filed on Jun. 26, 2019, which claims the priority benefit of European Patent Application No 18180884.1, filed on Jun. 29, 2018, the contents of which are hereby incorporated by reference.

FIELD OF THE INVENTION

The disclosure relates to a battery, a device, and methods of operating the same for wireless power transfer.

BACKGROUND OF THE INVENTION

In many systems, a battery is used to power a device when there is no mains power available to power the device. A battery has contacts and these contacts can be contaminated. In some applications, the contamination of contacts can cause problems. This has been addressed in existing systems by fully sealing the battery. However, when the battery is fully sealed, there are no contact points possible. To address this, there are some existing systems in which the power connection between the battery and the device to be powered is wireless. As such, in these existing systems, the battery can wirelessly transfer power to the device. Wireless power transfer is used in many systems. For example, smartphones can be charged by way of wireless power transfer.

However, wireless power transfer suffers from the downside that it is associated with power loss and a voltage drop. The power loss can be compensated to an extent by charging the battery with an external power source either in a wired way or wirelessly, such as in the manner described in US 2017/0133862. Nevertheless, it is not currently possible to compensate for the voltage drop and this can negatively impact the efficiency of wireless power transfer and even the operation of the device that is being charged using wireless power transfer.

SUMMARY OF THE INVENTION

As noted above, a limitation with existing systems in which wireless power transfer is used is that they suffer from inefficient wireless power transfer between the battery and the device and even ineffective operation of the device due to a voltage drop that is associated with wireless power transfer. It would thus be valuable to have an improvement to address the existing problems.

Therefore, according to a first aspect, there is provided a battery comprising a first electronic circuit. The first electronic circuit is configured to operate in a transfer mode to wirelessly transfer power to a device and operate in a receive mode to wirelessly receive power from the device. The first electronic circuit it also configured to adapt a voltage gain of the first electronic circuit to compensate for a voltage drop between the battery and the device during any one or more of the wireless transfer of power to the device when the battery is operating in the transfer mode and the wireless receipt of power from the device when the battery is operating in the receive mode.

In some embodiments, the first electronic circuit may be configured to operate in the transfer mode to wirelessly transfer power to the device at, or about, a frequency at which the voltage gain of the first electronic circuit is independent of a load of the first electronic circuit, wherein the load of the first electronic circuit comprises the device.

In some embodiments, the first electronic circuit may be configured to adapt the voltage gain of the first electronic circuit using a transformation ratio during the wireless transfer of power to the device when the battery is operating in the transfer mode.

In some embodiments, the first electronic circuit may comprise a full bridge converter configured to adapt the voltage gain of the first electronic circuit by being configured to modulate the wireless transfer of power to the device to adapt the voltage gain of the first electronic circuit during the wireless transfer of power to the device when the battery is operating in the transfer mode.

In some embodiments, the first electronic circuit may comprise a voltage multiplier configured to adapt the voltage gain of the first electronic circuit during the wireless receipt of power from the device when the battery is operating in the receive mode. In some embodiments, the voltage multiplier may comprise a part of the full bridge converter operating as the voltage multiplier.

According to a second aspect, there is provided a device comprising a second electronic circuit. The second electronic circuit is configured to operate in a transfer mode to wirelessly transfer power to a battery and operate in a receive mode to wirelessly receive power from the battery. The second electronic circuit is also configured to adapt a voltage gain of the second electronic circuit to compensate for a voltage drop between the device and the battery during any one or more of the wireless transfer of power to the battery when the device is operating in the transfer mode and the wireless receipt of power from the battery when the device is operating in the receive mode.

In some embodiments, the second electronic circuit may be configured to operate in the transfer mode to wirelessly transfer power to the battery at, or about, a frequency at which the voltage gain of the second electronic circuit is independent of a load of the second electronic circuit, wherein the load of the second electronic circuit comprises the battery.

In some embodiments, the second electronic circuit may be configured to adapt the voltage gain of the second electronic circuit using a transformation ratio during the wireless transfer of power to the battery when the device is operating in the transfer mode.

In some embodiments, the second electronic circuit may comprise a full bridge converter configured to adapt the voltage gain of the second electronic circuit by being configured to modulate the wireless transfer of power to the battery to adapt the voltage gain of the second electronic circuit during the wireless transfer of power to the battery when the device is operating in the transfer mode.

In some embodiments, the second electronic circuit may comprise a full bridge rectifier configured to adapt the voltage gain of the second electronic circuit by being configured to rectify the wireless receipt of power from the battery to adapt the voltage gain of the second electronic circuit during the wireless receipt of power from the battery when the device is operating in the receive mode. In some embodiments, the full bridge rectifier may comprise a part of the full bridge converter operating as the full bridge rectifier.

In some embodiments, the second electronic circuit may comprise a voltage multiplier configured to adapt the voltage gain of the second electronic circuit during the wireless receipt of power from the battery when the device is operating in the receive mode.

According to a third aspect, there is provided a system comprising the battery described earlier and the device described earlier.

According to a fourth aspect, there is provided a method of operating a battery comprising a first electronic circuit. The first electronic circuit is configured to operate in a transfer mode to wirelessly transfer power to a device and a receive mode to wirelessly receive power from the device. The method comprise adapting a voltage gain of the first electronic circuit to compensate for a voltage drop between the battery and the device during any one or more of the wireless transfer of power to the device when the battery is operating in the transfer mode and the wireless receipt of power from the device when the battery is operating in the receive mode.

According to a fifth aspect, there is provided a method of operating a device comprising a second electronic circuit. The second electronic circuit is configured to operate in a transfer mode to wirelessly transfer power to a battery and a receive mode to wirelessly receive power from the battery. The method comprises adapting a voltage gain of the second electronic circuit to compensate for a voltage drop between the device and the battery during any one or more of the wireless transfer of power to the battery when the device is operating in the transfer mode and the wireless receipt of power from the battery when the device is operating in the receive mode.

According to a sixth aspect, there is provided a computer program product comprising a computer readable medium, the computer readable medium having a computer readable code embodied therein, the computer readable code being configured such that, on execution by a suitable computer or processor, the computer or processor is caused to perform the method described above.

According to the aspects and embodiments described above, the limitations of existing systems are addressed. In particular, according to the above-described aspects and embodiments, a voltage drop between the battery and the device can be compensated by way of the adaptation of the voltage gain of the circuits of the battery and the device. As the voltage drop is compensated by way of the adaptation, the system can become load independent. Moreover, the adaptation can be performed bi-directionally such that, irrespective of whether the power transfer is from the battery to the device or from the device to the battery, the voltage drop associated with the power transfer can be compensated. In this way, power can be transferred wirelessly in an efficient manner in either direction and thus both the battery and the device can operate effectively. There are also no additional components needed in order to implement this efficient power transfer.

There is thus provided an improved battery, device, system, methods and computer program product for wireless power transfer, which is aimed at overcoming existing problems. These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

As noted above, there is provided herein an improved battery, device, system, methods and computer program for wireless power transfer. The device described herein can be any type of device. For example, the device described herein can be an appliance (such as a home appliance), a mobile device (such as a smart phone, a tablet, a laptop, or any other mobile device), or any other type of device.

Figure 1:
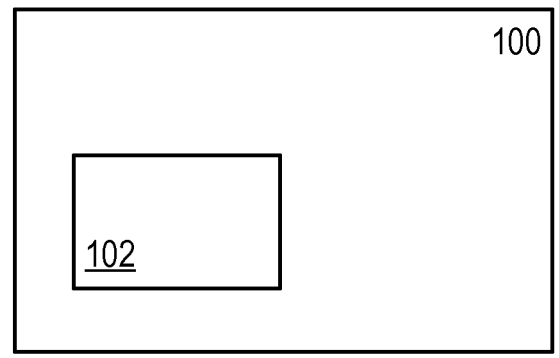
FIG. 1 is a block diagram of a battery according to an embodiment.

FIG. 1 illustrates a battery 100 according to an embodiment. As illustrated in FIG. 1, the battery 100 comprises a first electronic circuit 102. Briefly, the first electronic circuit 102 is configured to operate in a transfer mode 302 to wirelessly transfer power to a device 200 and to operate in a receive mode 304 to wirelessly receive power from the device 200. Thus, the wireless power transfer can operate in both directions. That is, the wireless power transfer is bi-directional. In this way, the wireless power transfer can operate from the battery 100 to the device 200 (e.g. to supply the device 200 with power from the battery 100) and from the device 200 to the battery 100 (e.g. to charge the battery 100 from the device 200). The first electronic circuit 102 is also configured to adapt a voltage gain of the first electronic circuit 102 to compensate for a voltage drop between the battery 100 and the device 200 during any one or more of the wireless transfer of power to the device 200 when the battery 100 is operating in the transfer mode 302 and the wireless receipt of power from the device 200 when the battery 100 is operating in the receive mode 304. Thus, the voltage drop between the battery 100 and the device 200 can be compensated when the battery 100 is operating in the transfer mode 302, in the receive mode 304, or in both the transfer mode 302 and the receive mode 304.

Figure 2:
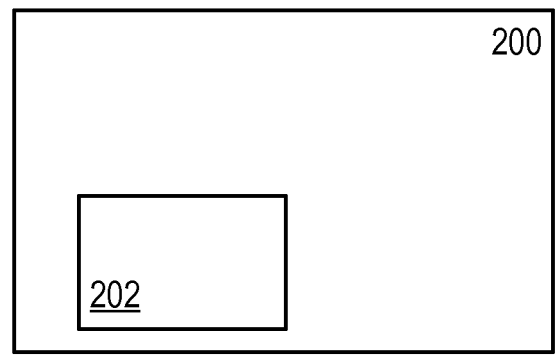
FIG. 2 is a block diagram of a device according to an embodiment.

FIG. 2 illustrates the device 200 according to an embodiment. As illustrated in FIG. 2, the device 200 comprises a second electronic circuit 202. Briefly, the second electronic circuit 202 is configured to operate in a transfer mode 304 to wirelessly transfer power to the battery 100 and to operate in a receive mode 302 to wirelessly receive power from the battery 100. Thus, the wireless power transfer can operate in both directions. That is, the wireless power transfer is bi-directional. In this way, the wireless power transfer can operate from the battery 100 to the device 200 (e.g. to supply the device 200 with power from the battery 100 or to discharge the battery 100) and from the device 200 to the battery 100 (e.g. to charge the battery 100 from the device 200). The second electronic circuit 202 is also configured to adapt a voltage gain of the second electronic circuit 202 to compensate for a voltage drop between the device 200 and the battery 100 during any one or more of the wireless transfer of power to the battery 100 when the device 200 is operating in the transfer mode 304 and the wireless receipt of power from the battery 100 when the device 200 is operating in the receive mode 302. Thus, the voltage drop between the device 200 and the battery 100 can be compensated when the device 200 is operating in the receive mode 302, in the transfer mode 304, or in both the receive mode 302 and the transfer mode 304.

Figure 3:
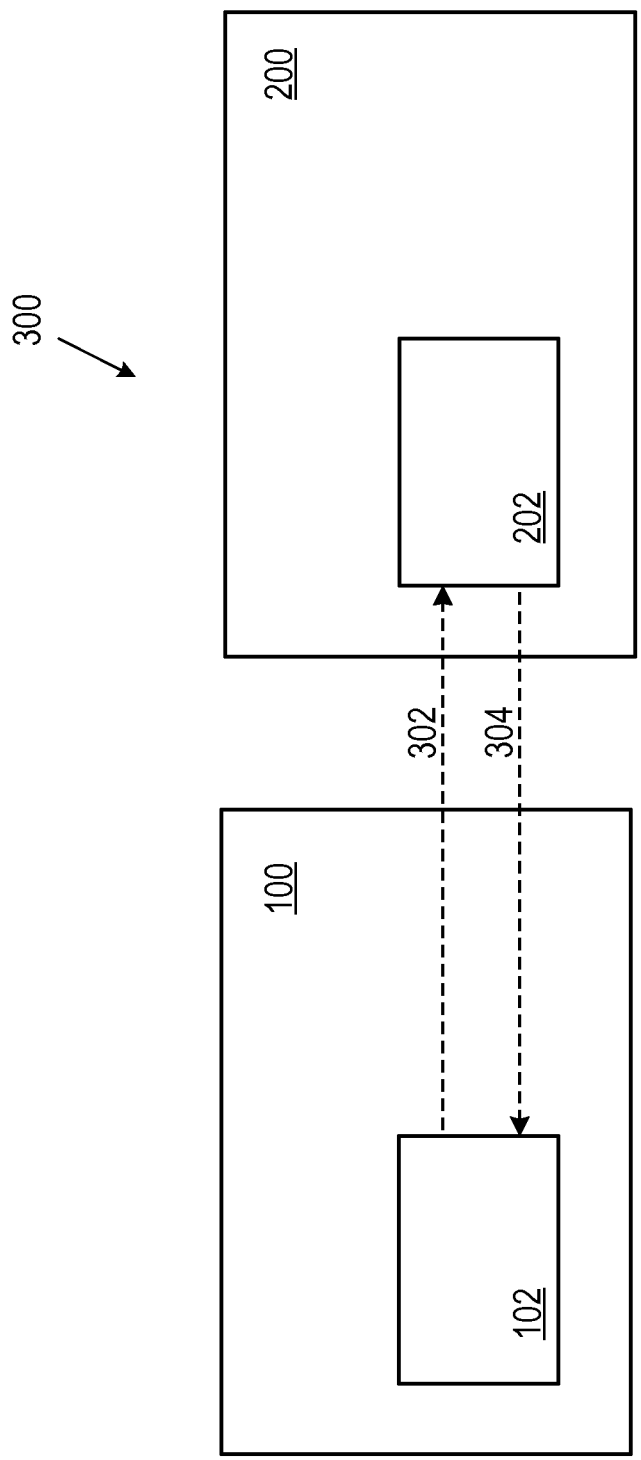
FIG. 3 is a block diagram of a system according to an embodiment.

FIG. 3 illustrates a system 300 according to an embodiment. The system 300 comprises the battery 100 described earlier with reference to FIG. 1 and device described earlier with reference to FIG. 2. The battery 100 and the device 200 can be wirelessly connected to each other. For example, in some embodiments, the battery 100 can be wirelessly detachable from the device 200. The battery 100 and the device 200 can be wirelessly connected to each other via a wireless power link. In some embodiments, the wireless power link can be an inductive link through which power is wirelessly transferred.

As illustrated in FIG. 3, the first electronic circuit 102 of the battery 100 is configured to operate in a transfer mode to wirelessly transfer power to a device 200, while the second electronic circuit 202 is configured to operate in a receive mode to wirelessly receive the power from the battery 100 (illustrated by the arrow 302 in FIG. 3). As also illustrated in FIG. 3, the second electronic circuit 202 is further configured to operate in a transfer mode to wirelessly transfer power to the battery 100, while the battery 100 is configured to operate in a receive mode to wirelessly receive the power from the device 200 (illustrated by the arrow 304 in FIG. 3). Thus, the wireless power transfer can operate in both directions 302, 304. That is, the wireless power transfer is bi-directional. In this way, the wireless power transfer can operate from the battery 100 to the device 200 (e.g. to supply the device 200 with power from the battery 100) and from the device 200 to the battery 100 (e.g. to charge the battery 100 from the device 200).

As mentioned earlier, the first electronic circuit 102 is configured to adapt a voltage gain of the first electronic circuit 102 to compensate for a voltage drop between the battery 100 and the device 200 during any one or more of the wireless transfer of power to the device 200 when the battery 100 is operating in the transfer mode 302 and the wireless receipt of power from the device 200 when the battery 100 is operating in the receive mode 304. Similarly, the second electronic circuit 202 is further configured to adapt a voltage gain of the second electronic circuit 202 to compensate for a voltage drop between the device 200 and the battery 100 during any one or more of the wireless transfer of power to the battery 100 when the device 200 is operating in the transfer mode 304 and the wireless receipt of power from the battery 100 when the device 200 is operating in the receive mode 302.

Thus, the voltage drop between the battery 100 and the device 200 can be compensated in the receive mode, in the transfer mode or in both the receive mode and the transfer mode. In effect, the wireless connection between the battery 100 and the device 200 can act as a galvanic or physical connection with minimal or no voltage drop.

Figure 4:
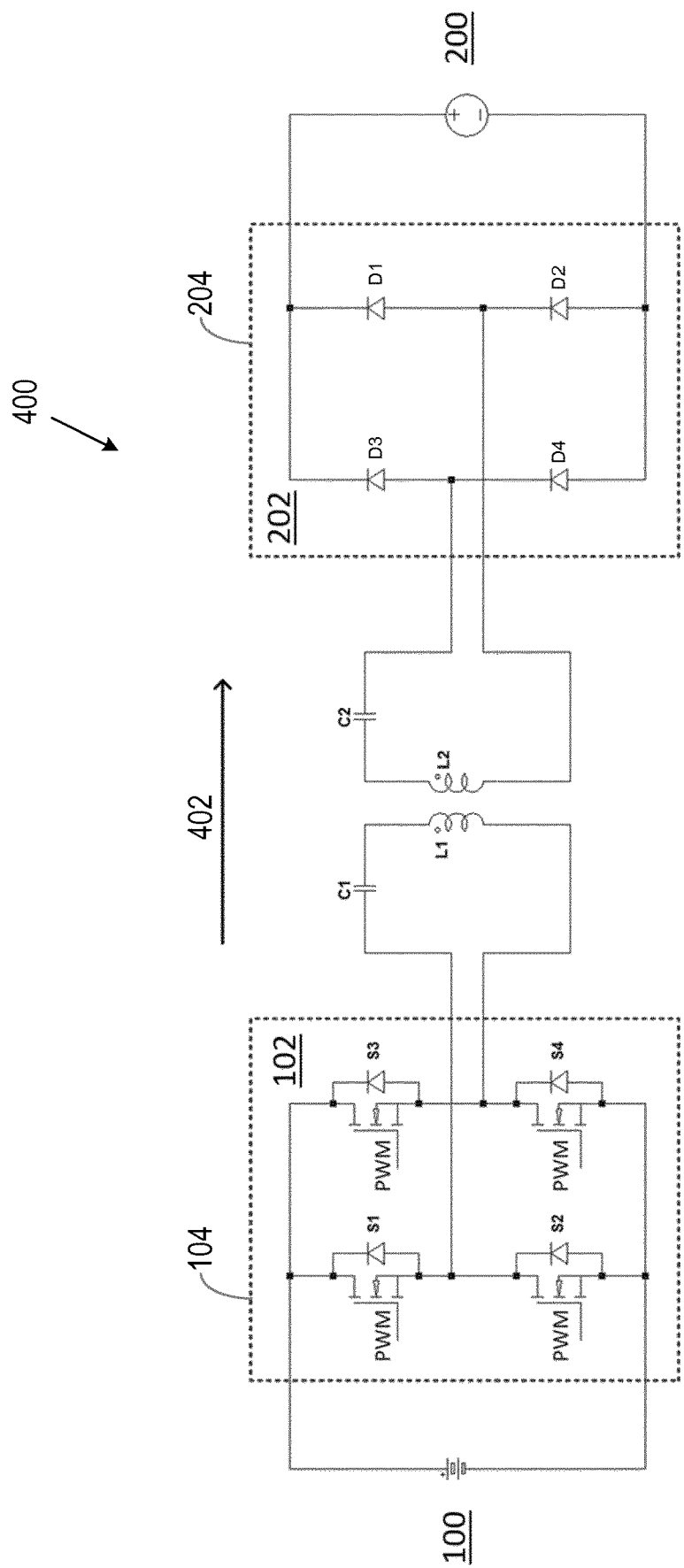
FIG. 4 is a block diagram of a system according to another embodiment.

FIG. 4 illustrates a system 400 according to another embodiment. The system 400 illustrated in FIG. 4 comprises the battery 100 described earlier with reference to FIGS. 1 and 3, according to an embodiment. The system 400 illustrated in FIG. 4 also comprises the device described earlier with reference to FIGS. 2 and 3, according to an embodiment. The battery 100 and the device 200 can be wirelessly connected to each other. For example, in some embodiments, the battery 100 can be wirelessly detachable from the device 200. The battery 100 and the device 200 can be wirelessly connected to each other via a wireless power link. In some embodiments, the wireless power link can be an inductive link through which power is wirelessly transferred. The battery 100 comprises the first electronic circuit 102 described earlier and it will be understood that the first electronic circuit 102 is configured in the manner described earlier with reference to FIGS. 1 and 3. The device 200 comprises the second electronic circuit 202 described earlier and it will also be understood that the second electronic circuit 202 is configured in the manner described earlier with reference to FIGS. 2 and 3.

As illustrated in FIG. 4, in some embodiments, the first electronic circuit 102 of the battery 100 can comprise a full bridge converter 104. As mentioned earlier, the first electronic circuit 102 is configured to adapt a voltage gain of the first electronic circuit 102 to compensate for a voltage drop between the battery 100 and the device 200 during any one or more of the wireless transfer of power to the device 200 when the battery 100 is operating in the transfer mode and the wireless receipt of power from the device 200 when the battery 100 is operating in the receive mode. FIG. 4 illustrates the wireless transfer of power to the device 200 when the battery 100 is operating in the transfer mode (illustrated by the arrow 402). Thus, in effect, the battery 100 is powering the device 200 in the embodiment illustrated in FIG. 4. In the embodiment of the battery 100 illustrated in FIG. 4, the full bridge converter 104 of the battery 100 is configured to adapt the voltage gain of the first electronic circuit 102. More specifically, the full bridge converter 104 of the battery 100 can be configured to adapt the voltage gain of the first electronic circuit 102 by being configured to modulate the wireless transfer of power to the device 200 to adapt the voltage gain of the first electronic circuit 102 during the wireless transfer of power to the device 200 when the battery 100 is operating in the transfer mode 402.

In some embodiments, the full bridge converter 104 of the battery 100 can comprise one or more switches S1, S2, S3, S4. In some embodiments, the full bridge converter 104 of the battery 100 can be configured to modulate the wireless transfer of power to the device 200 to adapt the voltage gain of the first electronic circuit 102 during the wireless transfer of power to the device 200 using the one or more switches S1, S2, S3, S4 to adapt the voltage gain of the first electronic circuit 102 during the wireless transfer of power to the device 200 when the battery 100 is operating in the transfer mode 402. A person skilled in the art will understand the general operation of a full bridge converter such as that illustrated in FIG. 4 and the manner in which the full bridge converter 104 can be used to modulate the wireless transfer of power to the device 200.

In some embodiments, such as that illustrated in FIG. 4, the first electronic circuit 102 may be configured to adapt the voltage gain of the first electronic circuit 102 by phase shift modulation during the wireless transfer of power to the device 200 when the battery 100 is operating in the transfer mode 402. In some embodiments, such as that illustrated in FIG. 4, the first electronic circuit 102 can be configured to adapt the voltage gain of the first electronic circuit 102 using a transformation (or transformer) ratio during the wireless transfer of power to the device 200 when the battery 100 is operating in the transfer mode 402. The transformation ratio can, for example, act as a gain in the voltage amplitude.

The transformation ratio of the voltage at the battery 100 to the voltage at the device 200 may, for example, be 1 to 1.4 (i.e. 1:1.4) during the wireless transfer of power the device 200 when the battery 100 is operating in the transfer mode 402. This causes a transformation ratio of the voltage at the device 200 to the voltage at the battery 100 to be 1 to 0.7 (i.e. 1:0.7) in the opposite direction, i.e. during the wireless transfer of power to the battery 100 when the device 200 is operating in the transfer mode. In order to compensate for this, as will be explained in more detail later, a voltage multiplier may be used for the opposite direction. The voltage multiplier can, for example, be used such that the transformation ratio of the voltage at the device 200 to the voltage at the battery 100 in the opposite direction is 1 to 1.4 (i.e. 1:(0.7*2)=1:1.4). In this way, the voltage drop associated with the wireless power transfer can be compensated for by the transformation ratio.

Thus, in some embodiments, a transformation ratio can be used to adapt the voltage gain in one direction in the system 400 and a voltage multiplier can be used to adapt the voltage gain in the other direction in the system 400. In some embodiments, a transformation ratio can be used to increase the voltage gain in one direction in the system 400. This causes a decrease in the voltage gain in the other direction in the system 400 and thus a voltage multiplier can be used to increase the voltage gain in the other direction in the system 400 (to compensate the down transformation), e.g. by using a voltage multiplier function. For example, a transformation ratio of 1 to 1.4 (i.e. 1:1.4) may be used to adapt the voltage gain in one direction in the system 400 and a voltage multiplier can be used to create a voltage gain in the other direction in the system 400 of 1 to 1.4 (i.e. 1:(0.7*2)=1:1.4). Also, in some embodiments, phase shift modulation can be used to control the voltage gain to be 1 to 1 (i.e. 1:1) in the system 400 or, more specifically, over the wireless power link in the system 400.

In some embodiments, such as that illustrated in FIG. 4, the battery 100 may comprise a first inductor L1 and the device 200 may comprise a second inductor L2. The first inductor L1 of the battery 100 and the second inductor L2 of the device 200 can be configured to wirelessly couple the battery 100 and the device 200. In some embodiments, the battery 100 may comprise a first capacitor C1. The first capacitor C1 can be configured to create a series resonance with the first inductor L1. In this way, the first capacitor C1 and the first inductor L1 can form a first resonance circuit according to some embodiments. Thus, in some embodiments, the battery 100 can comprise the first resonance circuit. In such embodiments, the first resonance circuit may be connected to the full bridge converter 104 of the battery 100 (e.g. to one or more switches S1, S2, S3, S4 of the full bridge converter 104 of the battery 100 according to some embodiments). The full bridge converter 104 of the battery 100 can be configured to drive the first resonance circuit of the battery 100.

As illustrated in FIG. 4, in some embodiments, the second electronic circuit 202 of the device 200 can comprise a full bridge rectifier 204. As mentioned earlier, the second electronic circuit 202 is configured to adapt a voltage gain of the second electronic circuit 202 to compensate for a voltage drop between the device 200 and the battery 100 during any one or more of the wireless transfer of power to the battery 100 when the device 200 is operating in the transfer mode and the wireless receipt of power from the battery 100 when the device 200 is operating in the receive mode. FIG. 4 illustrates the wireless receipt of power from the battery 100 when the device 200 is operating in the receive mode (illustrated by the arrow 402). In the embodiment of the device 200 illustrated in FIG. 4, the full bridge rectifier 204 of the device 200 can be configured to adapt the voltage gain of the second electronic circuit 202 during the wireless receipt of power from the battery 100 when the device 200 is operating in the receive mode 402. More specifically, the full bridge rectifier 204 of the device 200 can be configured to adapt the voltage gain of the second electronic circuit 202 by being configured to rectify the wireless receipt of power from the battery 100 to adapt the voltage gain of the second electronic circuit 202 during the wireless receipt of power from the battery 100 when the device 200 is operating in the receive mode 402. A person skilled in the art will understand the general operation of a full bridge rectifier such as that illustrated in FIG. 4 and the manner in which the full bridge rectifier 204 can be used to rectify the wireless receipt of power from the battery 100.

In some embodiments, the full bridge rectifier 204 of the device 200 may comprise one or more body diodes D1, D2, D3, D4. For example, in some embodiments, the full bridge rectifier 204 of the device 200 can comprise one or more body diodes D1, D2, D3, D4 of at least one metal oxide semiconductor field effect transistor (MOSFET). In some embodiments, the full bridge rectifier 204 of the device 200 can be configured to rectify the wireless receipt of power from the battery 100 using one or more body diodes D1, D2, D3, D4 to adapt the voltage gain of the second electronic circuit 202 during the wireless receipt of power from the battery 100 when the device 200 is operating in the receive mode 402. In embodiments where the one or more body diodes D1, D2, D3, D4 are of at least one MOSFET, the at least one MOSFET may be turned off when the one or more body diodes D1, D2, D3, D4 are used for rectifying the wireless receipt of power from the battery 100.

In some embodiments, the second electronic circuit 202 of the device 200 may comprise a full bridge converter. The full bridge converter of the device 200 can take the same form as the full bridge converter 104 of the battery 100 according to some embodiments and thus the corresponding description of the full bridge converter 104 of the battery 100 will be understood to also apply to the full bridge converter of the device 200 according to these embodiments. In embodiments where the device 200 comprises a full bridge converter, the full bridge rectifier 204 of the device 200 can comprise a part of the full bridge converter of the device 200 operating as the full bridge rectifier 204. Thus, in some embodiments, the full bridge converter of the device 200 may comprise the one or more body diodes D1, D2, D3, D4 described earlier.

In some embodiments, the full bridge converter of the device 200 may be configured to switch to operate as the full bridge rectifier 204 of the device 200. For example, in some embodiments, the full bridge rectifier 204 of the device 200 can be realized by operating the full bridge converter of the device 200 in a certain position. For example, in some embodiments, when using the full bridge rectifier 204 of the device 200, a leg of the full bridge converter of the device 200 may be set to the same state. Any leg (e.g. left leg or right leg) of the full bridge converter of the device 200 can be set to the same state. For example, any body diode D1, D2, D3, D4 of the full bridge converter of the device 200 can be switched on. The leg that is not used for the full bridge rectifier 204 of the device 200 can be used as the full bridge converter of the device 200. Thus, no extra components are required in the system 400, since the body diodes D1, D2, D3, D4 used for the full bridge converter of the device 200 can be reused for the full bridge rectifier 204 of the device 200 to provide the extra function of voltage drop compensation.

Although not illustrated in FIG. 4, according to some embodiments, the full bridge rectifier 204 of the device 200 may comprise one or more schottky diodes. In embodiments where the full bridge rectifier 204 of the device 200 also comprises one or more body diodes D1, D2, D3, D4, the one or more schottky diodes may be in parallel with the one or more body diodes D1, D2, D3, D4. In some embodiments, the full bridge rectifier 204 of the device 200 can be configured to rectify the wireless receipt of power from the battery 100 using one or more schottky diodes to adapt the voltage gain of the second electronic circuit 202 during the wireless receipt of power from the battery 100 when the device 200 is operating in the receive mode 402. In this way, power losses may be minimized.

In some embodiments, such as that illustrated in FIG. 4, the device 200 may comprise a second capacitor C2. The second capacitor C2 can be configured to create a series resonance with the second inductor L2. In this way, the second capacitor C2 and the second inductor L2 can form a second resonance circuit according to some embodiments. Thus, in some embodiments, the device 200 can comprise the second resonance circuit. In these embodiments, the second resonance circuit may be connected to the full bridge rectifier 204 of the device 200, e.g. to one or more body diodes D1, D2, D3, D4 of the full bridge rectifier 204 of the device 200 according to some embodiments.

In some embodiments, synchronous rectification may be used by controlling the one or more body diodes D1, D2, D3, D4 of the full bridge converter of the device 200. For example, in embodiments where the one or more body diodes D1, D2, D3, D4 of the full bridge converter of the device 200 are of at least one MOSFET, synchronous rectification can be where the at least one MOSFET is turned on during a time when the one or more body diodes D1, D2, D3, D4 of the full bridge converter of the device 200 (or the one or more schottky diodes of the full bridge converter of the device 200) are conducting. The synchronous rectification may improve the efficiency of the system 400.

Figure 5:
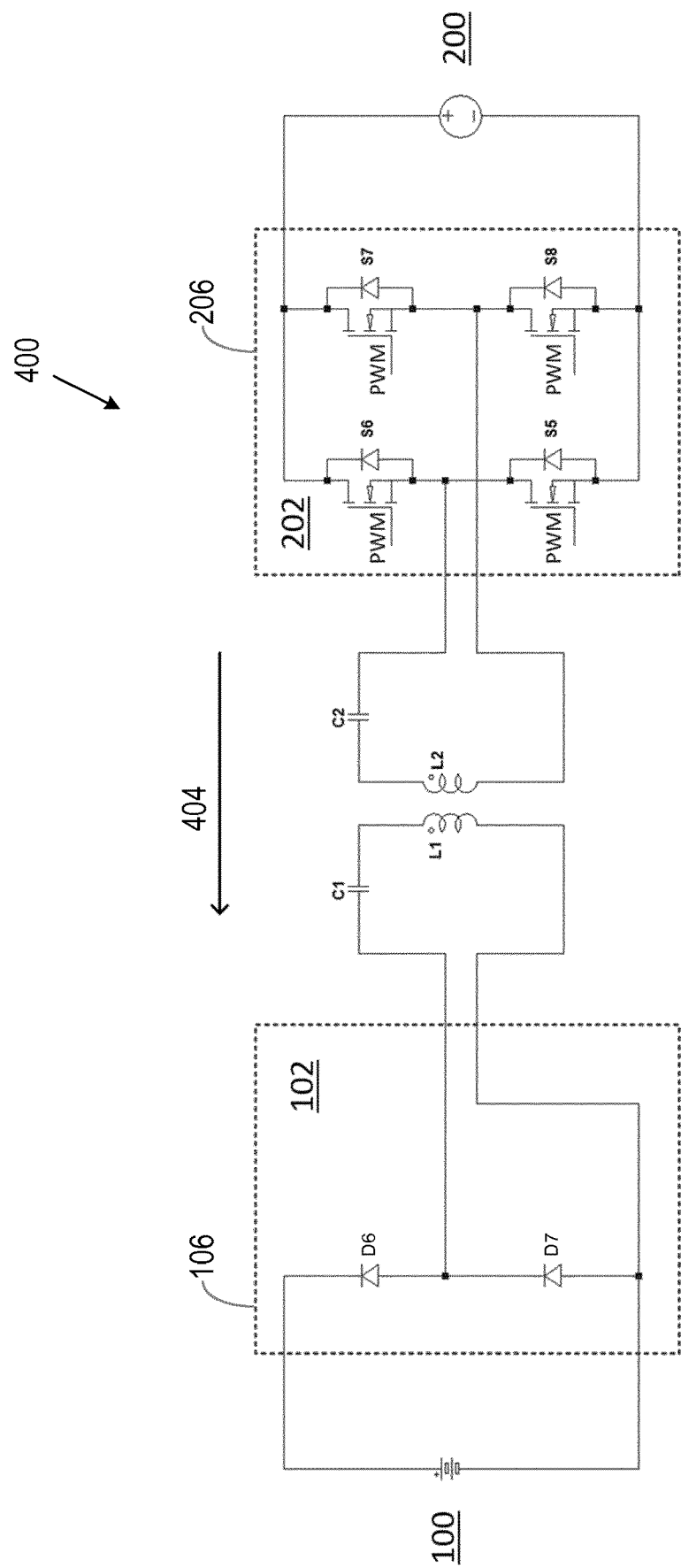
FIG. 5 is a block diagram of a system according to another embodiment.

FIG. 5 illustrates the system 400 according to another embodiment. In the embodiment illustrated in FIG. 5, the first electronic circuit 102 of the battery 100 comprises a voltage multiplier (or voltage multiplier circuit) 106. In some embodiments, the voltage multiplier 106 may comprise a voltage multiplier that is configured to double voltage. Thus, in some embodiments, the voltage multiplier 106 may be a voltage doubler (or voltage doubler circuit). As mentioned earlier, the first electronic circuit 102 is configured to adapt a voltage gain of the first electronic circuit 102 to compensate for a voltage drop between the battery 100 and the device 200 during any one or more of the wireless transfer of power to the battery 100 when the device 200 is operating in the transfer mode and the wireless receipt of power from the battery 100 when the device 200 is operating in the receive mode. FIG. 5 illustrates the wireless transfer of power to the battery 100 when the device 200 is operating in the transmit mode (illustrated by the arrow 404). Thus, FIG. 5 illustrates the wireless transfer of power in the opposite direction to FIG. 4.

In the embodiment of the battery 100 illustrated in FIG. 5, the voltage multiplier 106 of the battery 100 can be configured to adapt the voltage gain of the first electronic circuit 102 during the wireless receipt of power from the device 200 when the battery 100 is operating in the receive mode 404. More specifically, the voltage multiplier 106 of the battery 100 can be configured to adapt the voltage gain of the first electronic circuit 102 by being configured to multiply the wireless receipt of power from the device 200 to adapt the voltage gain of the first electronic circuit 102 during the wireless receipt of power from the device 200 when the battery 100 is operating in the receive mode 404. In this way, the voltage drop associated with the wireless power transfer can be compensated for by the voltage multiplier 106 of the battery 100.

In some embodiments, the voltage multiplier 106 of the battery 100 can comprise one or more body diodes D6, D7. For example, in some embodiments, the voltage multiplier 106 of the battery 100 can comprise one or more body diodes D6, D7 of at least one metal oxide semiconductor field effect transistor (MOSFET). In embodiments where the one or more body diodes D6, D7 are of at least one MOSFET, the at least one MOSFET may be turned off when the one or more body diodes D6, D7 of are used for multiplying the wireless receipt of power from the device 200.

As described earlier, in some embodiments, the battery 100 may comprise a full bridge converter 104. In these embodiments, the voltage multiplier 106 of the battery 100 can comprise a part of the full bridge converter 104 operating as the voltage multiplier 106. Thus, in some embodiments, the full bridge converter 104 of the battery 100 may comprise the one or more body diodes D6, D7 described earlier. In some embodiments, the full bridge converter 104 of the battery 100 may be configured to switch to operate as the voltage multiplier 106 of the battery 100. For example, in some embodiments, the voltage multiplier 106 of the battery 100 can be realized by operating the full bridge converter 104 of the battery 100 in a certain position.

For example, in some embodiments, when using the voltage multiplier 106 of the battery 100, one leg of the full bridge converter 104 of the battery 100 may be turned off. For example, in embodiments where the body diodes D6, D7 are of at least one MOSFET, the MOSFETs of one leg of the full bridge converter 104 of the battery 100 may be turned off. The other leg of the full bridge converter 104 of the battery 100 can be set to the same state. That is, the other leg of the full bridge converter 104 of the battery 100 may be static. In embodiments where the body diodes D6, D7 are of at least one MOSFET, for example, the other leg of the full bridge converter 104 of the battery 100 can be static where one MOSFET is turned on, the other MOSFET is turned off, and the MOSFETs do not switch during operation. Any leg (e.g. left leg or right leg) of the full bridge converter 104 of the battery 100 can be set to the same state. The leg that is not used for the voltage multiplier 106 of the battery 100 can be used as the full bridge converter 104 of the battery 100. Thus, no extra components are required in the system 400, since the body diodes D6, D7 used for the full bridge converter 104 of the battery 100 can be reused for the voltage multiplier 106 of the battery 100 to provide the extra function of voltage drop compensation.

In some embodiments, such as that illustrated in FIG. 5, the battery 100 may comprise a first inductor L1 and the device 200 may comprise a second inductor L2. The first inductor L1 of the battery 100 and the second inductor L2 of the device 200 can be configured to wirelessly couple the battery 100 and the device 200. In some embodiments, the battery 100 may comprise a first capacitor C1. The first capacitor C1 can be configured to create a series resonance with the first inductor L1. In this way, the first capacitor C1 and the first inductor L1 can form a first resonance circuit according to some embodiments. Thus, in some embodiments, the battery 100 can comprise the first resonance circuit. In such embodiments, the first resonance circuit may be connected to the voltage multiplier 106 of the battery 100, e.g. to one or more body diodes D6, D7 of the voltage multiplier 106 of the battery 100 according to some embodiments.

As illustrated in FIG. 5, in some embodiments, the second electronic circuit 202 of the device 200 can comprise a full bridge converter 206. As mentioned earlier, the second electronic circuit 202 is configured to adapt a voltage gain of the second electronic circuit 202 to compensate for a voltage drop between the device 200 and the battery 100 during any one or more of the wireless transfer of power to the battery 100 when the device 200 is operating in the transfer mode and the wireless receipt of power from the battery 100 when the device 200 is operating in the receive mode. FIG. 5 illustrates the wireless transfer of power to the battery 100 when the device 200 is operating in the transfer mode (illustrated by the arrow 404). Thus, in effect, the device 200 is charging the battery 100 in the embodiment illustrated in FIG. 5. In the embodiment of the device 200 illustrated in FIG. 5, the full bridge converter 206 of the device 200 is configured to adapt the voltage gain of the second electronic circuit 202. More specifically, the full bridge converter 206 of the device 200 can be configured to adapt the voltage gain of the second electronic circuit 202 by being configured to modulate the wireless transfer of power to the battery 100 to adapt the voltage gain of the second electronic circuit 202 during the wireless transfer of power to the battery 100 when the device 200 is operating in the transfer mode 404.

In some embodiments, the full bridge converter 206 of the device 200 can comprise one or more switches S5, S6, S7, S8. In some embodiments, the full bridge converter 206 of the device 200 can be configured to modulate the wireless transfer of power to the battery 100 to adapt the voltage gain of the second electronic circuit 202 during the wireless transfer of power to the battery 100 using the one or more switches S5, S6, S7, S8 to adapt the voltage gain of the second electronic circuit 202 during the wireless transfer of power to the battery 100 when the device 200 is operating in the transfer mode 404. A person skilled in the art will understand the general operation of a full bridge converter such as that illustrated in FIG. 5 and the manner in which the full bridge converter 206 can be used to modulate the wireless transfer of power to the battery 100. In some embodiments, such as that illustrated in FIG. 5, the second electronic circuit 202 may be configured to adapt the voltage gain of the second electronic circuit 202 by phase shift modulation during the wireless transfer of power to the battery 100 when the device 200 is operating in the transfer mode 404. For example, the second electronic circuit 202 may be configured to control the voltage of the second electronic circuit 202 (e.g. at the full bridge converter 206 of the device 200) by phase shift modulation to maintain the voltage transfer from one end of the system to the other end of the system at 1 to 1. In some embodiments, such as that illustrated in FIG. 5, the second electronic circuit 202 can be configured to adapt the voltage gain of the second electronic circuit 202 using a transformation (or transformer) ratio during the wireless transfer of power to the battery 100 when the device 200 is operating in the transfer mode 404. The transformation ratio can, for example, act as a gain in the voltage amplitude.

As mentioned earlier with reference to FIG. 4, where the transformation ratio of the voltage at the battery 100 to the voltage at the device 200 is, for example, 1 to 1.4 (i.e. 1:1.4) during the wireless transfer of power to the device 200 when the battery 100 is operating in the transfer mode 402 as illustrated in FIG. 4, this causes a transformation ratio of the voltage at the device 200 to the voltage at the battery 100 to be 1 to 0.7 (i.e. 1:0.7) in the opposite direction, i.e. during the wireless transfer of power to the battery 100 when the device 200 is operating in the transfer mode 404 as illustrated in FIG. 5. In order to compensate for this, the first electronic circuit 102 of the battery 100 comprises the voltage multiplier 106 described earlier. The voltage multiplier 106 of the battery 100 can, for example, be used such that the transformation ratio of the voltage at the device 200 to the voltage at the battery 100 during the wireless transfer of power to the battery 100 when the device 200 is operating in the transfer mode 404 is 1 to 1.4 (i.e. 1:(0.7*2)=1:1.4).

Thus, in some embodiments, a transformation ratio can be used to adapt the voltage gain in one direction in the system 400 and a voltage multiplier can be used to adapt the voltage gain in the other direction in the system 400. In some embodiments, a transformation ratio can be used to increase the voltage gain in one direction in the system 400. This causes a decrease in the voltage gain in the other direction in the system 400 and thus a voltage multiplier can be used to increase the voltage gain in the other direction in the system 400 (to compensate the down transformation), e.g. by using a voltage multiplier function. For example, a transformation ratio of 1 to 1.4 (i.e. 1:1.4) may be used to adapt the voltage gain in one direction in the system 400 and a voltage multiplier can be used to create a voltage gain in the other direction in the system 400 of 1 to 1.4 (i.e. 1:(0.7*2)=1:1.4). Also, in some embodiments, phase shift modulation can be used to control the voltage gain to be 1 to 1 (i.e. 1:1) in the system 400 or, more specifically, over the wireless power link in the system 400.

In some embodiments, such as that illustrated in FIG. 5, a control option may be employed to control the output voltage at the battery 100. For example, the voltage multiplier 106 of the battery 100 may control the output voltage at the battery 100 according to some embodiments. In some embodiments, when the voltage multiplier 106 of the battery 100 is turned on and turned off with a certain duty cycle, the output voltage at the battery 100 can be controlled on the output according to some embodiments. In some embodiments, such as that illustrated in FIG. 5, the device 200 may comprise a second capacitor C2. The second capacitor C2 can be configured to create a series resonance with the second inductor L2. In this way, the second capacitor C2 and the second inductor L2 can form a second resonance circuit according to some embodiments. Thus, in some embodiments, the device 200 can comprise the second resonance circuit. In these embodiments, the second resonance circuit may be connected to the full bridge converter 206 of the device 200, e.g. to one or more switches S5, S6, S7, S8 of the full bridge converter 206 of the device 200 according to some embodiments. The full bridge converter 206 of the device 200 can be configured to drive the second resonance circuit of the device 200.

Figure 6:
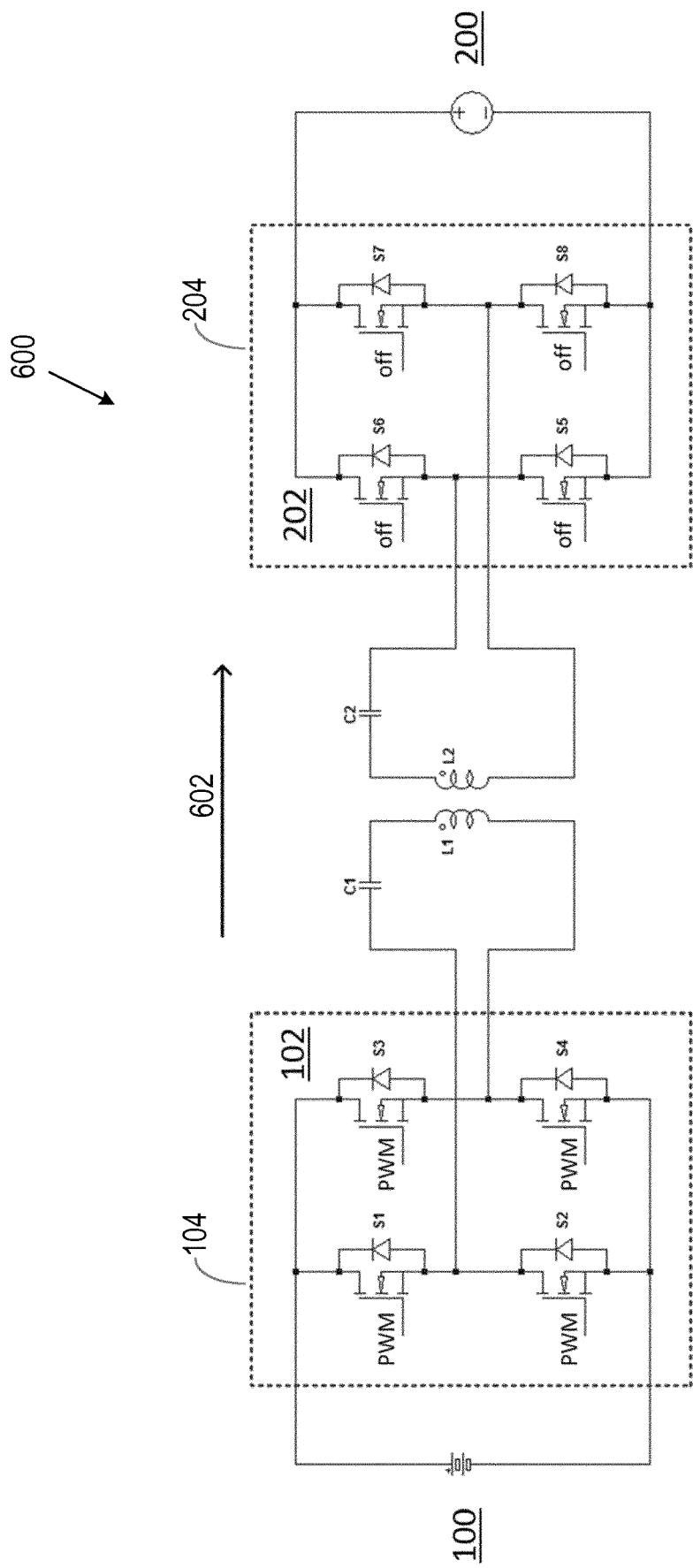
FIG. 6 is a block diagram of a system according to another embodiment.

FIG. 6 illustrates a system 600 according to another embodiment. The system 600 illustrated in FIG. 6 is as described earlier with reference to FIG. 4. However, FIG. 6 illustrates the second electronic circuit 202 of the device 200 comprising the full bridge rectifier 204 in full form. Thus, in the illustrated embodiment of FIG. 6, the full bridge rectifier 204 of the device 200 can comprise one or more switches S5, S6, S7, S8 according to some embodiments. The one or more switches S5, S6, S7, S8 comprise the one or more body diodes D1, D2, D3, D4 described earlier with reference to FIG. 4. It will thus be understood that the description accompanying FIG. 4 applies also to FIG. 6. In the illustrated embodiment of FIG. 6, when using the full bridge rectifier 204 of the device 200, the one or more switches S5, S6, S7, S8 may be turned off. In embodiments where the one or more switches S5, S6, S7, S8 comprise one or more body diodes D1, D2, D3, D4 of at least one MOSFET, as described earlier with reference to FIG. 4, the at least one MOSFET may be turned off when the one or more body diodes D1, D2, D3, D4 are used for rectifying the wireless receipt of power from the battery 100.

Figure 7:
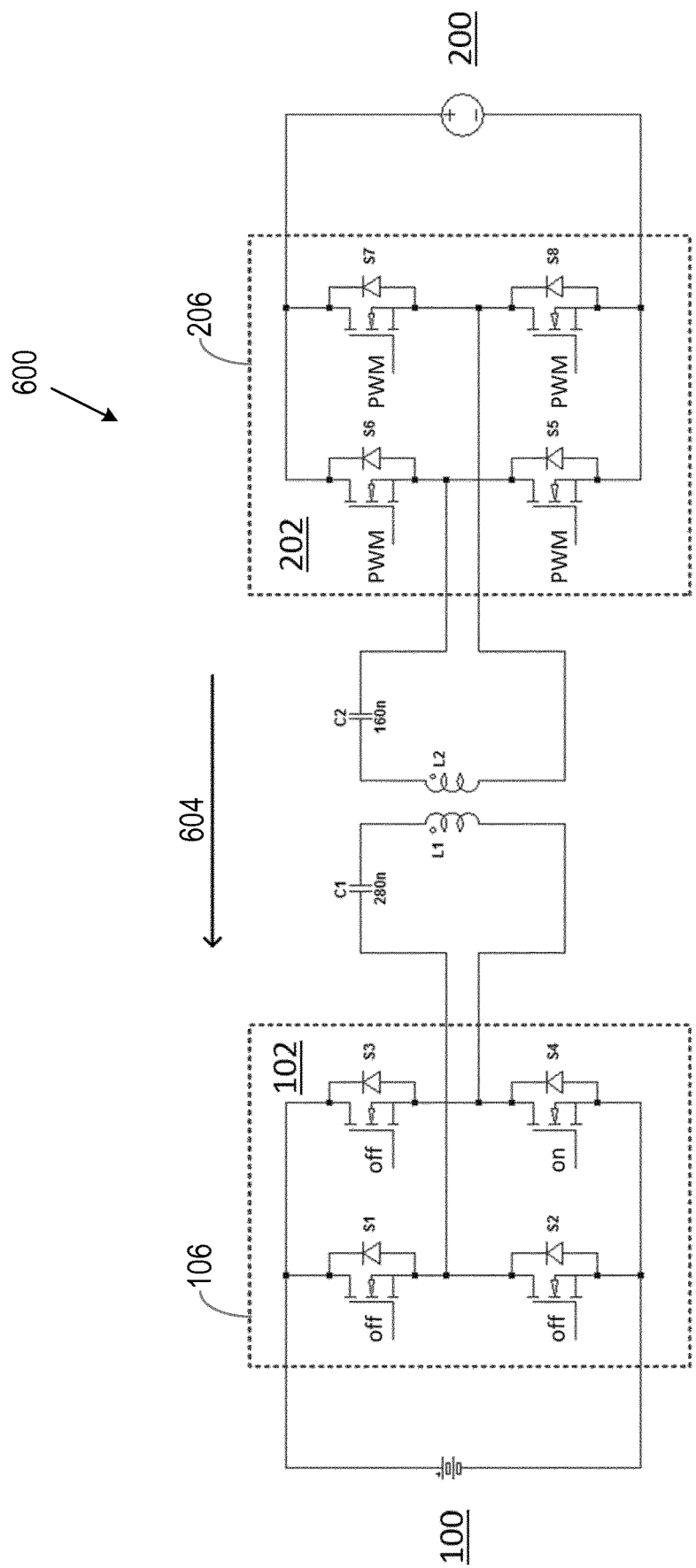
FIG. 7 is a block diagram of a system according to another embodiment.

FIG. 7 illustrates the system 600 according to another embodiment. The system 600 illustrated in FIG. 7 is as described earlier with reference to FIG. 5. However, FIG. 7 illustrates the first electronic circuit 102 of the battery 100 comprising the voltage multiplier 106 in full form. Thus, in the illustrated embodiment of FIG. 7, the voltage multiplier 106 of the battery 100 can comprise one or more switches S1, S2, S3, S4 according to some embodiments. The one or more switches comprise the one or more body diodes D6, D7 described earlier with reference to FIG. 5. It will thus be understood that the description accompanying FIG. 5 applies also to FIG. 7. In the illustrated embodiment of FIG. 7, as described earlier with reference to FIG. 5, when using the voltage multiplier 106 of the battery 100, one leg of the full bridge converter 104 of the battery 100 may be turned off. For example, the switches S1, S2 of one leg of the voltage multiplier 106 of the battery 100 may be turned off. For example, in embodiments where the body diodes of the switches S1, S2 are of at least one MOSFET, the MOSFETs of one leg of the full bridge converter 104 of the battery 100 may be turned off.

The other leg of the full bridge converter 104 of the battery 100 can be set to the same state. That is, the other leg of the full bridge converter 104 of the battery 100 may be static. In embodiments where the body diodes of the switches S3, S4 are of at least one MOSFET, for example, the other leg of the full bridge converter 104 of the battery 100 can be static where one MOSFET is turned on, the other MOSFET is turned off, and the MOSFETs do not switch during operation. Any leg (e.g. left leg or right leg) of the full bridge converter 104 of the battery 100 can be set to the same state. The leg that is not used for the voltage multiplier 106 of the battery 100 can be used as the full bridge converter 104 of the battery 100. Thus, no extra components are required in the system 400, since the body diodes of the switches S1, S2, S3, S4 used for the full bridge converter 104 of the battery 100 can be reused for the voltage multiplier 106 of the battery 100 to provide the extra function of voltage drop compensation.

Although not illustrated in the figures, in some embodiments, the second electronic circuit 202 may comprise a voltage multiplier configured to adapt the voltage gain of the second electronic circuit 202 during the wireless receipt of power from the battery 100 when the device 200 is operating in the receive mode. For example, the second electronic circuit 202 of FIG. 4 may comprise such a voltage multiplier instead of the full bridge rectifier 204 according to some embodiments. Similarly, for example, the second electronic circuit 202 of FIG. 6 may comprise such a voltage multiplier instead of the full bridge rectifier 204 according to some embodiments. In embodiments where the second electronic circuit 202 comprises such a voltage multiplier, the voltage multiplier of the second electronic circuit 202 may operate and/or may be configured in the same manner as described earlier in respect of the voltage multiplier of the first electronic circuit 102. In some embodiments, the voltage multiplier of the second electronic circuit 202 may comprise a voltage multiplier that is configured to double voltage. Thus, in some embodiments, the voltage multiplier of the second electronic circuit 202 may be a voltage doubler (or voltage doubler circuit).

In any of the embodiments described herein, the first electronic circuit 102 of the battery 100 can be configured to operate in the transfer mode 302, 402, 602 to wirelessly transfer power to the device 200 at (or about) a frequency at which the voltage gain of the first electronic circuit 102 is independent of a load of the first electronic circuit 102. The load of the first electronic circuit 102 comprises the device 200. The point at which the voltage gain of the first electronic circuit 102 is independent of the load of the first electronic circuit 102 can be referred to as a load independent point. That is, the wireless power can be transferred to the device 200 at a frequency that is at or close to (or near) the load independent point according to some embodiments. The load independent point can comprise the frequency at a second resonance peak of a transfer function of the system 300, 400, 600. The amplitude of this second resonance peak is less dependent on the load of the system 300, 400, 600 than a first resonance peak of a transfer function of the system 300, 400, 600.

Similarly, in any of the embodiments described herein, the second electronic circuit 202 of the device 200 can be configured to operate in the transfer mode 304, 404, 604 to wirelessly transfer power to the battery 100 at (or about) a frequency at which the voltage gain of the second electronic circuit 202 is independent of a load of the second electronic circuit 202. The load of the second electronic circuit 202 comprises the battery 100. The point at which the voltage gain of the second electronic circuit 102 is independent of the load of the second electronic circuit 102 can be referred to as a load independent point. That is, the wireless power can be transferred to the battery 100 at a frequency that is at or close to (or near) the load independent point according to some embodiments. As mentioned earlier, the load independent point can comprise the frequency at a second resonance peak of a transfer function of the system 300, 400, 600. The amplitude of this second resonance peak is less dependent on the load of the system 300, 400, 600 than a first resonance peak of a transfer function of the system 300, 400, 600.

In any of the embodiments described herein, the voltage gained by the transformation ratio in the direction from battery 100 to device 200 can be more efficient than the voltage gained by the voltage multiplier. Thus, when using the transformer ratio in the direction from battery 100 to device 200, the most efficient direction is used when running on battery 100. This means that the battery time can be increased due to less power loss.

There is also provided a method of operating the battery 100 described herein, which comprises the first electronic circuit 102 that is configured to operate in a transfer mode 302, 402, 602 to wirelessly transfer power to a device 200 and a receive mode 304, 404, 604 to wirelessly receive power from the device 200. This method comprises adapting a voltage gain of the first electronic circuit 102 to compensate for a voltage drop between the battery 100 and the device 200 during any one or more of the wireless transfer of power to the device 200 when the battery 100 is operating in the transfer mode 302, 402, 602 and the wireless receipt of power from the device 200 when the battery 100 is operating in the receive mode 304, 404, 604. It will also be understood that the method may comprise any other steps, and any combination of steps, corresponding to the operation of the battery 100 described earlier with reference to FIGS. 1, 3, 4, 5, 6 and 7.

There is also provided a method of operating the device 200 described herein, which comprises the second electronic circuit 202 that is configured to operate in a transfer mode 304, 404, 604 to wirelessly transfer power to a battery 100 and a receive mode 302, 402, 602 to wirelessly receive power from the battery 100. This method comprises adapting a voltage gain of the second electronic circuit 202 to compensate for a voltage drop between the device 200 and the battery 100 during any one or more of the wireless transfer of power to the battery 100 when the device 200 is operating in the transfer mode 304, 404, 604 and the wireless receipt of power from the battery 100 when the device 200 is operating in the receive mode 302, 402, 602. It will be understood that the method may comprise any other steps, and any combination of steps, corresponding to the operation of the device 200 described earlier with reference to FIGS. 2, 3, 4, 5, 6 and 7.

In addition to the battery 100, device 200, system 300, 400, 600 and methods described earlier, there is also provided a computer program product comprising a computer readable medium. The computer readable medium has a computer readable code embodied therein. The computer readable code is configured such that, on execution by a suitable computer or processor, the computer or processor is caused to perform any of the methods described herein. The computer readable medium may be, for example, any entity or device capable of carrying the computer program product. For example, the computer readable medium may include a data storage, such as a ROM (such as a CD-ROM or a semiconductor ROM) or a magnetic recording medium (such as a hard disk). Furthermore, the computer readable medium may be a transmissible carrier, such as an electric or optical signal, which may be conveyed via electric or optical cable or by radio or other means. When the computer program product is embodied in such a signal, the computer readable medium may be constituted by such a cable or other device or means. Alternatively, the computer readable medium may be an integrated circuit in which the computer program product is embedded, the integrated circuit being adapted to perform, or used in the performance of, any of the methods described herein.

There is thus provided herein an improved battery 100, device 200, system 300, 400, 600, methods, and computer program product.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A battery for a system including a device, the battery comprising a first electronic circuit configured to:
    operate in a transfer mode to wirelessly transfer power to the device;
    operate in a receive mode to wirelessly receive power from the device;
    adapt a voltage gain of the first electronic circuit to compensate for a voltage drop between the battery and the device during any one or more of the wireless transfer of power to the device when the battery is operating in the transfer mode and the wireless receipt of power from the device when the battery is operating in the receive mode;
    operate in the transfer mode to wirelessly transfer power to the device at, or about, a frequency at which the voltage gain of the first electronic circuit is independent of a load of the first electronic circuit, wherein the load of the first electronic circuit comprises the device, wherein the frequency is a frequency of a second resonance peak of a transfer function of the system; and
    adapt the voltage gain of the first electronic circuit using a transformation ratio during the wireless transfer of power to the device when the battery is operating in the transfer mode,
    wherein the first electronic circuit comprises:
    a voltage multiplier configured to adapt the voltage gain of the first electronic circuit during the wireless receipt of power from the device when the battery is operating in the receive mode.

2. The battery as claimed in claim 1, wherein the first electronic circuit comprises:
    a full bridge converter configured to adapt the voltage gain of the first electronic circuit by being configured to:
    modulate the wireless transfer of power to the device to adapt the voltage gain of the first electronic circuit during the wireless transfer of power to the device when the battery is operating in the transfer mode.

3. The battery as claimed in claim 2, wherein the voltage multiplier comprises a part of the full bridge converter operating as the voltage multiplier.

4. A system comprising:
    a battery including a first electronic circuit configured to:
    operate in a transfer mode to wirelessly transfer power to a device;
    operate in a receive mode to wirelessly receive power from the device; and
    adapt a voltage gain of the first electronic circuit to compensate for a voltage drop between the battery and the device during any one or more of the wireless transfer of power to the device when the battery is operating in the transfer mode and the wireless receipt of power from the device when the battery is operating in the receive mode; and
    the device including a second electronic circuit configured to:
    operate in a transfer mode to wirelessly transfer power to the battery;
    operate in a receive mode to wirelessly receive power from the battery;
    adapt a voltage gain of the second electronic circuit to compensate for a voltage drop between the device and the battery during any one or more of the wireless transfer of power to the battery when the device is operating in the transfer mode and the wireless receipt of power from the battery when the device is operating in the receive mode;
    operate in the transfer mode to wirelessly transfer power to the battery at, or about, a frequency at which the voltage gain of the second electronic circuit is independent of a load of the second electronic circuit, wherein the load of the second electronic circuit comprises the battery, wherein the frequency is a frequency of a second resonance peak of a transfer function of the system; and adapt the voltage gain of the second electronic circuit using a transformation ratio during the wireless transfer of power to the battery when the device is operating in the transfer mode, wherein the first electronic circuit comprises:

a voltage multiplier configured to adapt the voltage gain of the first electronic circuit during the wireless receipt of power from the device when the battery is operating in the receive mode.

5. The system as claimed in claim 4, wherein the second electronic circuit comprises:

a full bridge converter configured to adapt the voltage gain of the second electronic circuit by being configured to:

modulate the wireless transfer of power to the battery to adapt the voltage gain of the second electronic circuit during the wireless transfer of power to the battery when the device is operating in the transfer mode.

6. The system as claimed in claim 4, wherein the second electronic circuit comprises:

a full bridge rectifier configured to adapt the voltage gain of the second electronic circuit by being configured to:

rectify the wireless receipt of power from the battery to adapt the voltage gain of the second electronic circuit during the wireless receipt of power from the battery when the device is operating in the receive mode.

7. The system as claimed in claim 6, wherein the full bridge rectifier comprises a part of a full bridge converter operating as the full bridge rectifier.

8. The system as claimed in claim 4, wherein the second electronic circuit comprises:

a voltage multiplier configured to adapt the voltage gain of the second electronic circuit during the wireless receipt of power from the battery when the device is operating in the receive mode.

9. The system of claim 4, wherein the first electronic circuit is configured to adapt the voltage gain of the first electronic circuit using a further transformation ratio during the wireless transfer of power to the device when the battery is operating in the transfer mode, and wherein the transformation ratio and the further transformation ratio are different.

10. A method of operating a system comprising a battery, wherein the battery comprises a first electronic circuit configured to operate in a transfer mode to wirelessly transfer power to a device and a receive mode to wirelessly receive power from the device, the first electronic circuit having a voltage multiplier and the device comprising a second electronic circuit configured to operate in a transfer mode to wirelessly transfer power to the battery and a receive mode to wirelessly receive power from the battery, wherein the method comprises:

adapting a voltage gain of the first electronic circuit using the voltage multiplier to compensate for a voltage drop between the battery and the device during any one or more of the wireless transfer of power to the device when the battery is operating in the transfer mode and the wireless receipt of power from the device when the battery is operating in the receive mode, including operating the first electronic circuit to adapt the voltage gain of the first electronic circuit using a transformation ratio during the wireless transfer of power to the device when the battery is operating in the transfer mode;

adapting a voltage gain of the second electronic circuit to compensate for a voltage drop between the device and the battery during any one or more of the wireless transfer of power to the battery when the device is operating in the transfer mode and the wireless receipt of power from the battery when the device is operating in the receive mode; and operating the first electronic circuit in the transfer mode to wirelessly transfer power to the device at, or about, a frequency at which the voltage gain of the first electronic circuit is independent of a load of the first electronic circuit, wherein the load of the first electronic circuit comprises the device, wherein the frequency is a frequency of a second resonance peak of a transfer function of the system.

11. The method of claim 10, wherein the first electronic circuit comprises a full bridge converter configured to adapt the voltage gain of the first electronic circuit by being configured to modulate the wireless transfer of power to the device to adapt the voltage gain of the first electronic circuit during the wireless transfer of power to the device when the battery is operating in the transfer mode.

12. The method of claim 11, wherein the voltage multiplier comprises a part of the full bridge converter operating as the voltage multiplier.

13. A non-transitory computer readable medium comprising computer instructions which, when executed by a processor, configure the processor to cause performance of the method of claim 10.

* * * * *